United States Patent [19]

Pennino

[11] Patent Number: 5,629,032
[45] Date of Patent: May 13, 1997

[54] BLOW-MOLDING APPARATUS

[75] Inventor: Frank Pennino, Farmingdale, N.Y.

[73] Assignee: Pari Industries, Inc., Jamaica, N.Y.

[21] Appl. No.: 653,884

[22] Filed: May 28, 1996

Related U.S. Application Data

[63] Continuation-in-part of Ser. No. 497,222, Aug. 25, 1995, abandoned.

[51] Int. Cl.⁶ .................................................. B29C 49/50
[52] U.S. Cl. ........................... 425/168; 425/525; 425/527; 425/531; 425/535
[58] Field of Search ................................. 429/168, 525, 429/527, 531, 535

[56] References Cited

U.S. PATENT DOCUMENTS

| | | | |
|---|---|---|---|
| 3,369,272 | 2/1968 | Martin, Jr. et al. | 425/525 |
| 4,032,278 | 6/1977 | Kuenzig et al. | 425/527 |
| 4,187,070 | 2/1980 | Martin, Jr. | 425/525 |
| 4,871,492 | 10/1989 | Spoetzl | 425/527 |
| 5,256,055 | 10/1993 | Morris | 425/527 |

FOREIGN PATENT DOCUMENTS 1062085  3/1967  United Kingdom ............ 425/527

*Primary Examiner*—Robert Davis

[57] ABSTRACT

A pair of shear steels are carried by companion mold members. Each shear steel including a shearing edge and a sealing rim, is slidable along a path perpendicular to the axis of a blow pin and to the open-close path of the mold members. The shearing edges of the shear steels are aligned with each other and with the blow pin by a locating element of each of the shear steels. Alignment takes place during the closing of the mold members. The locating elements may be discrete elements or the sealing rims may perform the locating function.

13 Claims, 3 Drawing Sheets

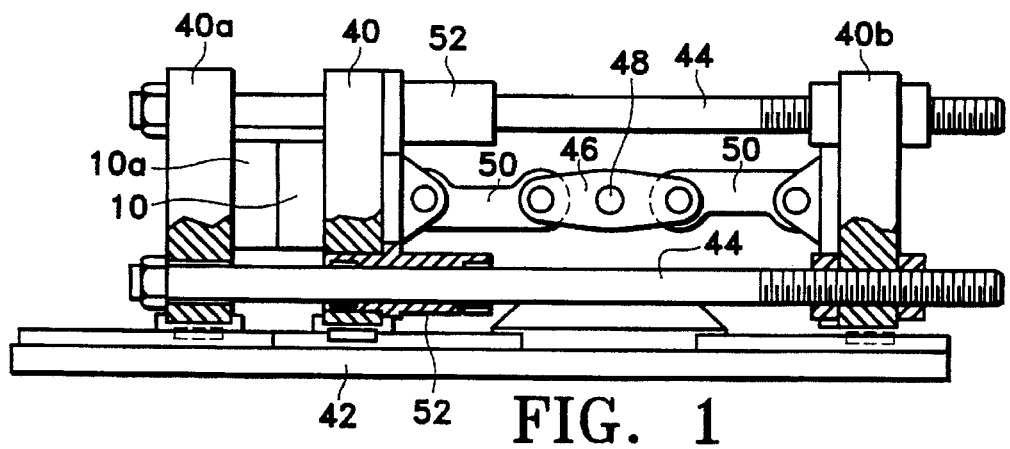
FIG. 1
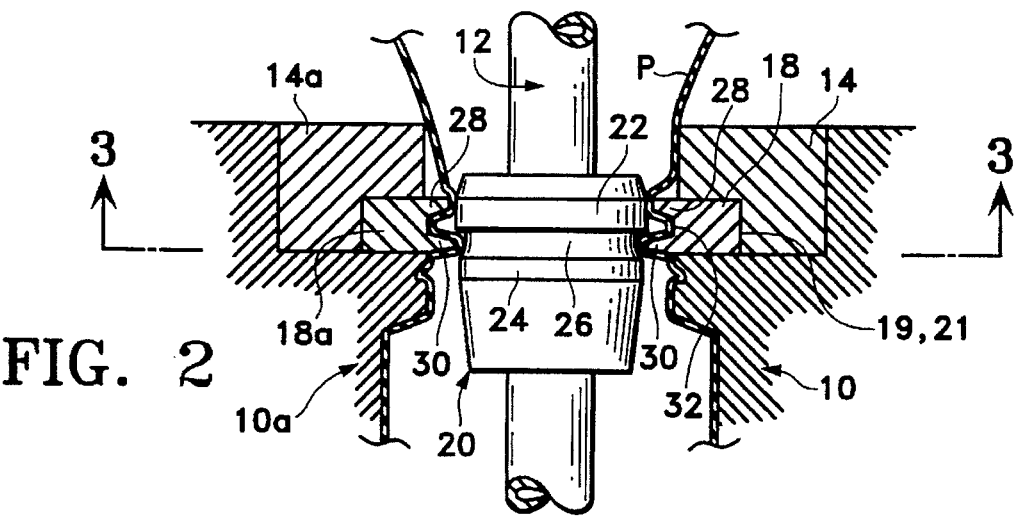
FIG. 2
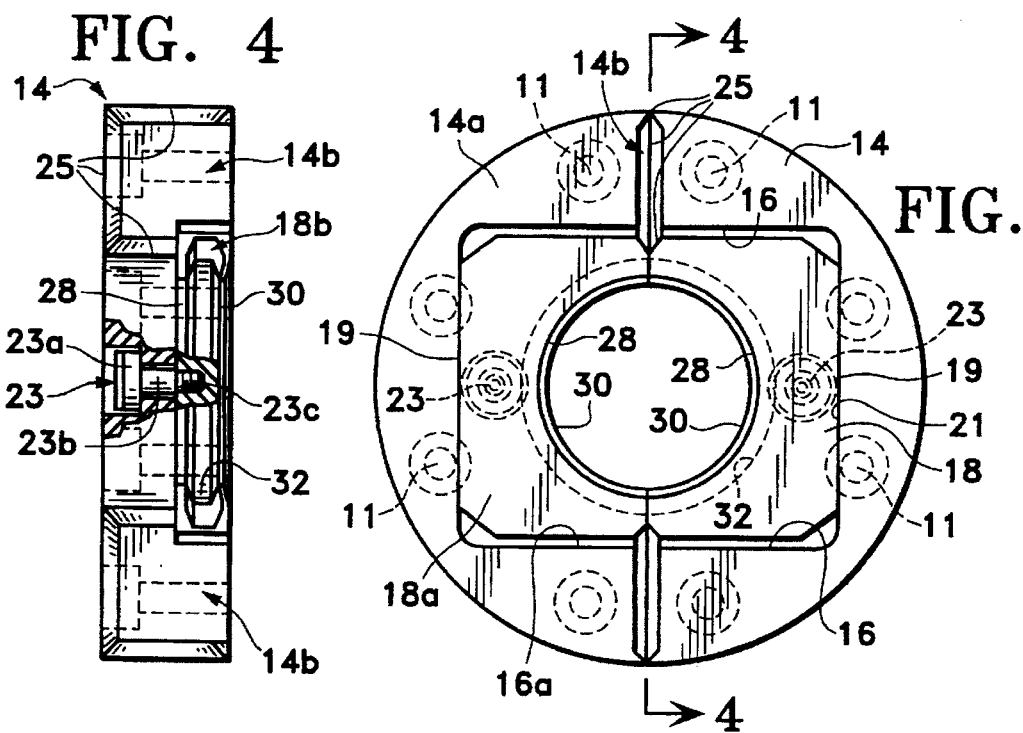
FIG. 4
FIG. 3

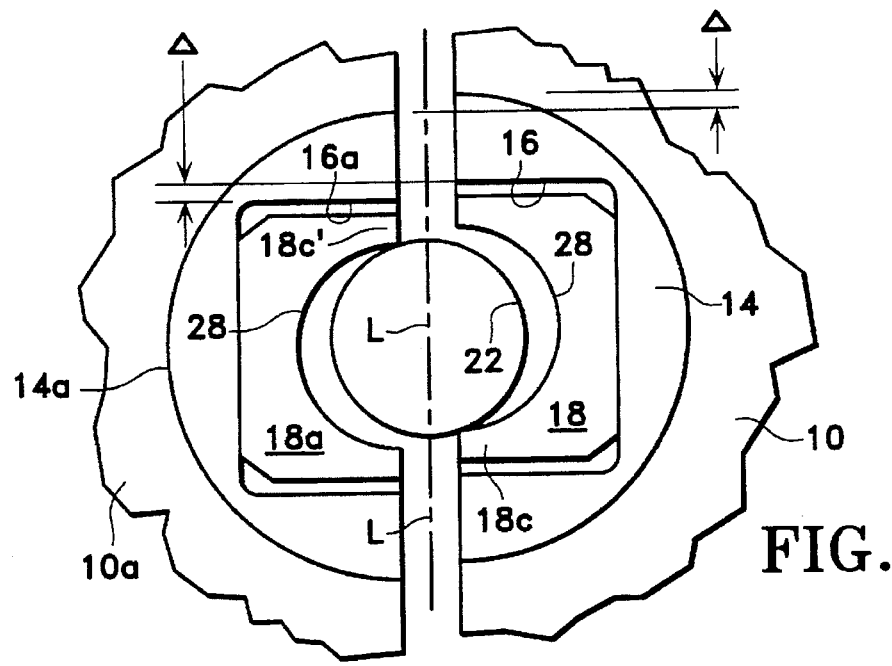
FIG. 5
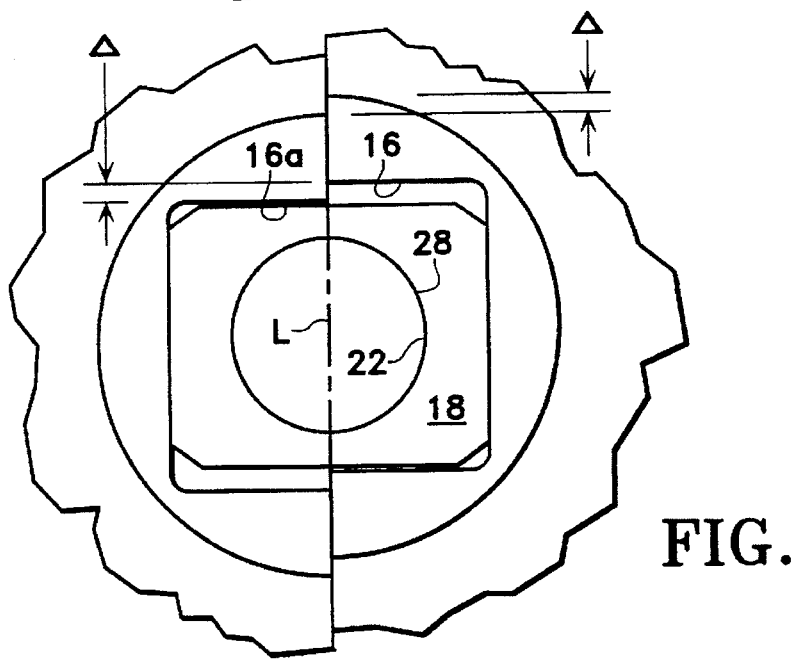
FIG. 6
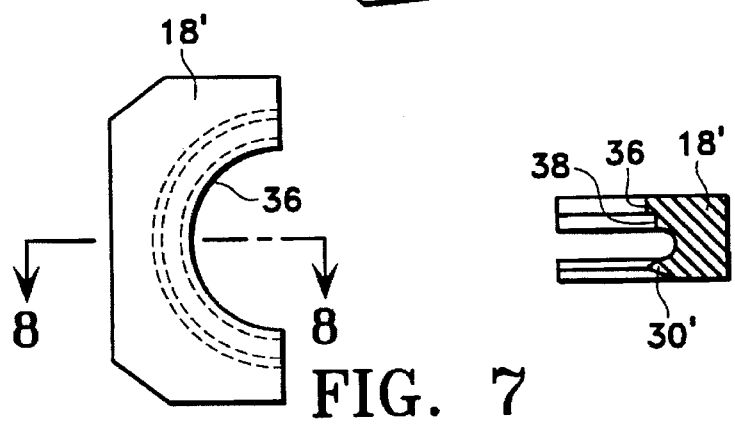
FIG. 7
FIG. 8

BLOW-MOLDING APPARATUS

The present invention relates to blow-molding apparatus, and in particular, to sealing and shearing devices in blow-molding apparatus. This is a continuation-in-part of my application Ser. No. 08/497,222 filed Aug. 25, 1995 now abandoned.

BACKGROUND

Blow-molding apparatus of more-or-less standardized construction has long been used to produce bottles from plastic resins. Halves of a mold are mounted opposite each other on platens; the platens are driven toward each other by a toggle mechanism to close the mold and to hold the mold closed during a brief blow-molding interval. Reverse operation of the mechanism opens the mold, allowing removal of the blowmolded bottle. While the mold is open, a roughly cylindrical parison of heat-softened plastic resin is moved over a blow pin and extends across the space between the mold halves from the neck-forming portions of the mold to a position beyond the portions of the mold that form the bottom of the bottle. The blow pin is positioned between the mold halves.

When the mold closes, the free end of the parison is sealed shut by the bottom-forming portions of the mold halves. At the same time, half-circle sealing rims in the neck-forming portions of the mold seal the parison around a seal-forming ring of the body of a blow pin. A high-pressure burst of air then enters the parison via the blow pin, causing the parison to expand against the surfaces of the mold, thus shaping the bottle.

The neck portions of the mold halves include half-circle shearing edges coaxial with the half-circle sealing rims. As soon as the bottle has been shaped by the burst of air inflating the parison against the surfaces of the mold cavity, the blow pin is shifted axially in a short stroke such that a shearing ring of the body of the blow pin cooperates with the shearing edges at the neck-forming portion of the mold to sever the neck of the bottle from scrap that is produced in the operation.

The half-circle sealing rims and the half-circle shearing rings become worn and must be replaced periodically. They are removably secured to the neck-forming portions of the mold halves by what may be called a mounting base or, briefly, a "base". In the standardized blow-molding apparatus, the base is circular and it is called a "base ring". U.S. Pat. No. 4,032,278, issued Jun. 28, 1977, shows a now-standard assembly of a base ring, sealing elements and shearing elements designed for easy replacement when they become worn.

SUMMARY OF THE INVENTION

An object of the invention resides in providing improvements in blow-molding apparatus, for extending the useful life of the shearing devices that cooperate to sever the neck of a newly blown container from the scrap that is produced in the blow-molding operation. A related object of the invention resides in providing a pair of novel more durable shearing and sealing assemblies for cooperation with the blow pin of blow-molding apparatus for shearing the neck of a newly blow-molded container.

The invention is particularly applicable to blow-molding of containers of the "pre-finish system". The pouring opening of a container produced by that system has a turned-in rim. In the pre-finish system, the mold includes a neck ring, and a shear insert, and in that system there is a blow pin and a cylinder arrangement for moving the blow pin up and down. The blow pin is down when the mold halves close. An upper two-part sealing ring in the neck-forming part of the mold centers the blow pin and forms a seal to trap the blow air pressure. While the mold is held closed, the blow pin is driven up so that the parts of the two-part shear ring coact with a shearing edge on the blow pin to sever scrap plastic from the in-turned edge of the container's opening.

In blow-molding apparatus of this type, the two halves of the shear ring must be properly aligned. Underlying this invention is the recognition by Applicant that, despite the ultimate exercise of care, the required alignment does not endure for long. This is because the two halves of the mold, in which the halves of the sealing rim and the halves of the shearing ring are mounted, become misaligned because of some looseness of the platen guides. That misalignment causes damage to the half-circle sealing rims and to the half-circle shearing elements mounted in the neck-forming halves of the mold, and such misalignment also causes damage to the shearing edge of the blow pin.

Worn guides of the platens is a cause of looseness that allows a small amount of harmless shift of the mold halves in relation to each other up and down (parallel to the blow-pin axis); limited relative shift of the mold halves in that direction is of little consequence. However, a small shift of one mold half in relation to the other, transverse to the blow-pin axis and transverse to the open-and-close direction of movement of the mold halves, has serious consequences. The two halves of the shearing ring that are mounted in the mold halves become shifted so that, when the mold is closed, the halves of the shearing ring no longer form a full-circle edge for cooperation with the circular shearing edge provided by the blow pin. When the blow pin is driven upward in its shearing stroke, the shearing edge of the blow pin is damaged by the two half-circle shearing elements mounted in the neck-forming portions of the mold, and the half-circle shearing elements are damaged by the shearing edge of the blow pin.

The problem of avoiding damage to the shearing edges of the blow pin and of the shearing elements carried by the mold members is met, in part, by mounting the semicircular shear elements slidably relative to their mold members. Where, as is customary, each shear element is mounted on a base which, in turn, is fixed to each mold member of a pair, the shear elements are here mounted slidably relative to such mounting base. The direction of sliding is along a path that is perpendicular to both the axis of the blow pin and perpendicular to the open-and-close motion of the mold members. That patch of sliding of each shear element which has its semicircular shear edge is identifiable indirectly as parallel to a line between the extremities of the semicircular shear edge.

Looseness of the slide guides of the platens results in the shear members being disposed opposite to each other with their extremities misaligned when the mold members are closed. The centers of their semicircular edges do not have a common axis. Here the shear elements are mounted so that their centers can be brought into alignment with a common axis. That axis and the axis of the full-circle shear edge of the blow pin are here brought into mutual alignment. Then, when the blow pin is shifted up from its "down" position that prevails when the mold members close, a full-circle shearing edge is provided by the shear elements of the mold members; that full-circle shearing edge coacts properly with the circular shearing edge of the blow pin.

Adjustment of the shearing edges carried by the mold members is here performed automatically during each closing stroke of the mold members.

In the illustrative embodiment of the invention shown in the drawings and described in detail below, a semicircular sealing rim is fixed coaxially to a corresponding semicircular shearing element, constituting what is called a "shear steel" hereinafter; each shear steel is slidable relative to its mounting base, along a path parallel to the extremities of the semicircular shearing edge.

As the mold members move closer to each other, the extremities of the semicircular sealing rims flank the circular, or (more precisely) the cylindrical sealing ring of the blow pin. Ultimately, when the mold members are fully closed against each other, the semicircular sealing rims of the pair of shear steels carried by the mold members ape forced against opposite sides of the blow pin's cylindrical sealing ring. As the mold members are moving toward each other in their closing stroke, the sealing rims are forced against, and into close fit with, the sealing ring of the blow pin. As is usual, the axis of the blow pin can be deflected somewhat. To some extent (as may prove necessary) the axes of the two shear steels and the axis of the blow pin are all forced to coincide with one another. Consequently, the semicircular shearing edges are shifted (as may be necessary) into coaxial alignment with each other and with the axis of the blow pin's full-circle shearing edge. Momentarily afterward, the blow pin is moved axially to perform the shearing operation.

In the above description, the semicircular sealing rims coact with the sealing ring of the blow pin to perform two functions. One function is usual: the parison that is disposed in the neck-forming portion of the mold members, being a sleeve around the blow pin, is squeezed between the semicircular sealing rims carried by the mold members and the sealing ring of the blow pin. A seal is formed to contain a burst of high pressure air that inflates the parison against the surfaces of the mold for shaping the container. The other function is to adjust the shear steels (as required) to align the axes of the semicircular shearing edges with each other along a common axis and to align that common axis with the axis of the blow pin. In this way, the full-circle shearing edge of the combined shear steels is aligned with the circular shearing edge of the blow pin. An alternative may prove advantageous: to provide each shear steel not only with a sealing half-circle rim and a shearing half-circle shearing edge, but additionally with a third element whose sole function is to coact tightly with the blow pin in such a manner as to perform the function of aligning the axes of the two shear steels with each other and with the blow-pin's axis. This alternative adds an element to each shear steel, but it is capable of performing separately the sealing function and the alignment function according to separate optimal criteria. The preferred embodiment of the invention is the illustrative embodiment that is described in detail below and shown in the accompanying drawings.

An additional modification of the originally preferred embodiment is also shown in the accompanying drawings. In the modification, the originally preferred embodiment is improved by providing an adjustment which assures accurate motion of the shear steels toward each other without resort to exacting precision in the manufacture of the shear steels and their mounting bases. The result is that the shear steels are driven accurately toward the blow pin and against the parison that extends as a sheath along. and around the blow pin. The operation of this modification is the same as that of the originally preferred embodiment if that embodiment were manufactured to the same accuracy as the properly adjusted modification.

Both in the first embodiment, above, and in the new modification, the sliding motion of each shear steel is guided by cooperating slide-guides of the shear steel and the mounting base for the shear steel. In the originally preferred embodiment of the invention, a slide guide surface of the shear steel has face contact with a slide guide surface of its mounting base. Considering the desired accuracy, it is difficult to produce a shear steel and its mounting base with the slide guide surfaces located where they should be in relation to the sealing half-circular rim and the shearing half-circular rim, especially bearing in mind the need for repetitive accurate reproduction of many of such assemblies. In the modification shown in the accompanying drawings and described below, one of the slide guide surfaces is replaced by an adjustment comprising set screws, ideally two set screws. More particularly, two guiding set screws for each shear steel are provided in its respective mounting base. The set screws are adjusted so that the semicircular sealing and shearing edges are located where they should be in relation to their respective mounting bases.

It may become necessary to readjust the set screws after the shear steels have been in use for many blow-molding cycles; on occasion, the need for readjustment may arise due to wear, and despite choice of screws designed for preventing drift out of adjustment.

In the Drawings:

FIG. 1 is a side elevation of the operating mechanism of a widely standard blow-molding machine; and FIGS. 2–8 show the originally preferred embodiment of the invention;

FIG. 2 is a lateral view of a portion of a blow pin and in cross-section, portions of a mold in closed condition, the mold bearing novel shear steel assemblies, the blow pin appearing in its "down" position;

FIG. 3 is a bottom plan view of two shear steel assemblies as viewed from line 3—3 in FIG. 2;

FIG. 4 is a side elevation, partly in cross-section of the right-hand shear steel assembly of FIG. 3, as seen from the line 4—4 in FIG. 3;

FIG. 5 is a diagrammatic fragmentary view of a pair of misaligned mold members, shown partially separated and closing on a blow pin;

FIG. 6 is a diagrammatic fragmentary view of the apparatus of FIG. 5, with the mold members fully closed;

FIG. 7 is a top plan view of a modified form of shear steel;

FIG. 8 is a cross-sectional view at the plane 8—8 in FIG. 7 of the modification of FIG. 7;

DETAILED DESCRIPTION OF THE ILLUSTRATIVE EMBODIMENT AND THE MODIFICATIONS

Figures 9, 10:
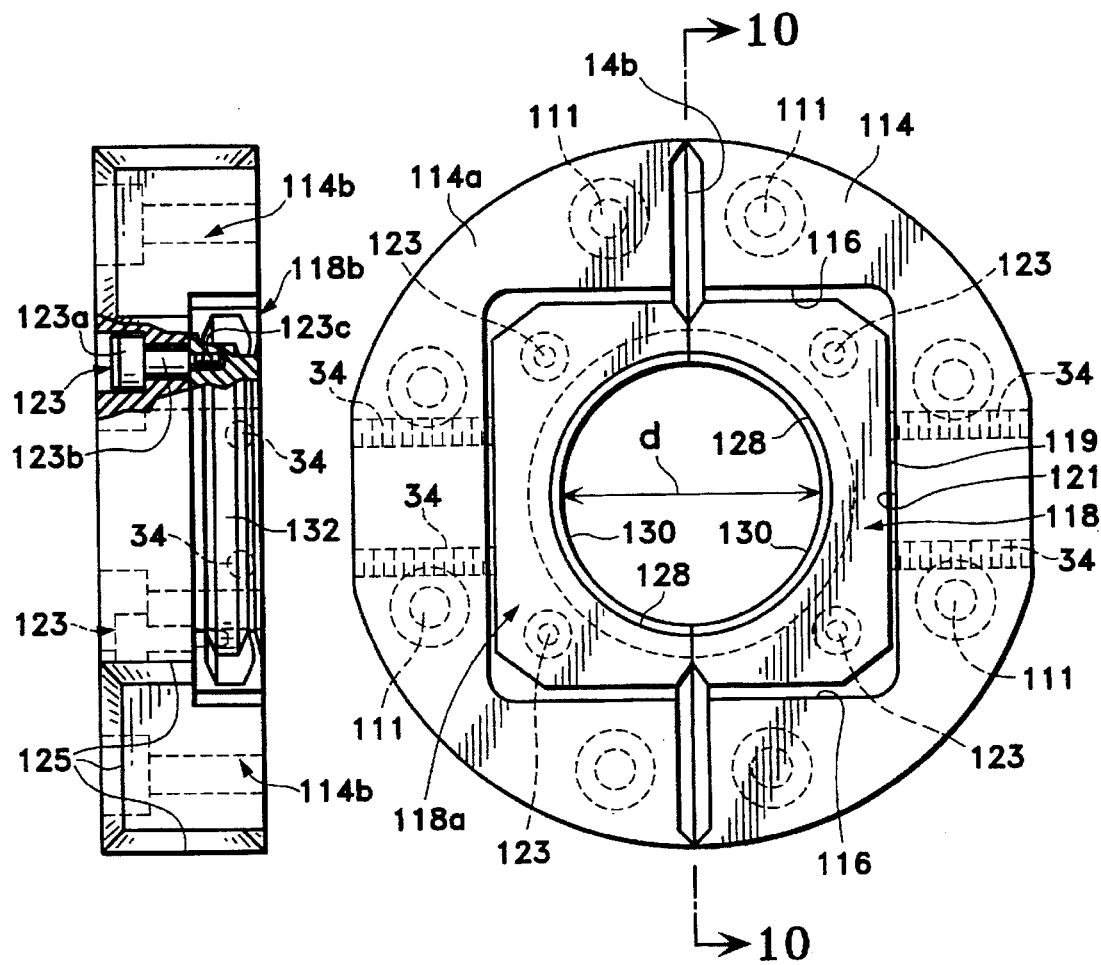
FIG. 9 is a view corresponding to FIG. 3 of a further modification of an assembly of shear steels and their respective mounting bases.
FIG. 10 is a side elevation of the right-hand assembly of the parts in FIG. 9, as seen from the plane 10—10 in FIG. 9.

In the drawings, a pair of mold members 10, 10a is shown in FIG. 1 in their closed condition. These mold members are fixed to movable platens 40, 40a which have slide guides in base 42; a third platen 40b is also slidable on base 42. Guide bars 44 are fixed adjustably to platen 40b; there are at least two more guide bars (not shown); in some machines there are six or more guide bars 44. A center link 46 of a dual toggle mechanism is operable through stroke of approximately 110° about stationary pivot 48 by a power actuator (not shown). Toggle links 50 are operable by link 46 to draw the platens 40 and 40a away from each other and thus open mold 10, 10a; and link 46 is then operable into the position shown to erect the toggle linkage. When the toggle linkage becomes erect, platen 40 is forced to the left and platen 40b is forced to the right, driving guide bars 44 and platen 40a to the right. Elongated bushings 52 fixed to platen 40 form accurate guides for guide bars 44, for assuring accurate meeting of the molds or mold members. When the apparatus is properly adjusted, the erect toggle stretches the guide bars resiliently by approximately 0.010 inch, putting a powerful pre-load on the molds.

Mold members 10 and 10a are shown closed in FIGS. 2 and 3. Semicircular mounting bases 14, 14a (which may be of aluminum) fit accurately in corresponding recesses in mold members 10, 10a; these bases are fixed firmly in the mold members by screws (not shown) in bores 11. Each mounting base 14, 14a provides a rectangular recess 16, 16a for slidably receiving a "shear steel" 18, 18a. These shear steels cooperate with a body 20 of a blow pipe 12.

Blow pipe 12 may be of the form shown and described in U.S. Pat. No. 4,234,299 issued Nov. 18, 1980 to Kuenzig et al. Associated with the blow pin is a conventional extruder and a guide passage (not shown) for delivering a tubular parison P of a suitable hot plastic (suitably soft) that descends around the blow pin and across the cavity of the mold members. See U.S. Pat. No. 3,369,272 issued to Martin et al on Feb. 20, 1968. The lower end of the parison is sealed shut by the mold members when they close. The parison is also flattened and sealed by the mold members at opposite sides of the container's neck. A carefully timed burst of high-pressure air inflates the parison against the walls of the cavity, to shape the container. Blow pin 12 extends through the container's neck; it blocks the escape of the high-pressure air via the neck of the container being formed.

In FIG. 2, blow pin 12 has an axially short cylindrical sealing ring 22. When the mold is closed, semi-cylindrical rims 28 of the shear steels 18, 18a act with sealing ring 22 to form a full-circle seal around the blow pin. The fit of the sealing rims 28 with the sealing ring 22 is snug, so much so that there might even be metal-to-metal air-blocking contact., supplemented by seal-forming plastic material of the parison.

Each shear steel 18, 18a has a flat guide surface 19 (FIG. 3) that bears against a companion flat guide surface 21 of its respective mounting base 14, 14a. The length of the shear steel in the direction parallel to guide surfaces 19, 21 and parallel to the parting faces of the mold members is less than the length of recess 16, 16a for purposes explained below. The space between that part of the mounting base 14, 14a which overhangs each shear steel (FIG. 2) and the mold surface on which the shear steel rests is slightly greater than the thickness of the shear steel, so that each shear steel is slidable contained in the space between each respective mounting base 14, 14a and mold member 10, 10a.

A screw 23 in each mounting base 14, 14a has a flat head 23a whose diameter is relatively large and a post 23b of smaller diameter extending from the head and a threaded portion 23c of still smaller diameter. Post 23b is slightly longer than the portion of the mounting base 14, 14a through which it extends so that, when the threaded portion of screw 23 is tightened in the shear steel, post 23b prevents the shear steel from being tightened face-to-face between the overhanging portion of the mounting base and the mold member, while the shear steel is securely retained in assembly to its mounting base.

Each shear steel 18, 18a has a recess 32 under its sealing rim 28. Each shear steel 18, 18a also has a semi-circular shearing edge 30 coaxial with and spaced below its sealing rim 28. When the mold is closed properly, the shearing edges of the two shear steels form a full-circle shearing edge. Blow pin 12 has a shearing ring 24 that provides a full-circle shearing edge. The blow pin is driven upward in a short severing stroke at the right moment in the cycle. The edge of the shearing ring coacts with the full-circle shearing edge comprising the shearing edges of the shear steels to sever the container's neck from scrap next to the neck.

In passing, it may be of interest that companion face-to-face areas 14b of the mounting bases 14 and 14a are shaped in the usual manner for forming hollow quick-cooling scrap portions of the parison adjoining the neck of the container that is to be formed. Mutually opposite end portions 18b of the shear steels 18, 18a are shaped to provide air passages to inflate portions of the parison between areas 14b of the mounting bases 14, 14a. Areas 14b are bounded by sealing edges 25 (FIGS. 3 and 4) that cause opposite walls of the parison to fuse together.

In FIG. 3, mounting bases 14 and 14a are shown in alignment with each other, their outer edge forming a circle. Sealing rims 28 are also in alignment, as are shearing edges 30; the sealing semicircular rims 28 of shear steels 18, 18a thus form a full-circle sealing rim that cooperates With sealing rim 22 of the the blow pin to contain the burst of high-pressure air. Correspondingly, the semicircular shearing edges 30 of shear steels 18, 18a form a full-circle shearing edge for cooperation with the shearing edge of shear ring 24 of the blow pin.

This described alignment of the shearing half-circles and the sealing half-circles to form the sealing and shearing semicircular elements into full circles occurs in conventional apparatus only when there is no looseness in the bearings that guide the mold members into aligned cooperation when the mold members become closed, and provided that the sealing elements and the shearing elements are properly located on their respective mold members. It may be imagined that, when the mold members have been closed, the sealing half-circles are misaligned relative to each other and the shearing half-circles are misaligned relative to each other, resembling a "D" and a mirror-image ⊂ with the two shapes offset along a common line, thus: ⊂P. This misalignment has various causes, resulting notably from looseness of the guides of the mold members. Thereafter,, when the blow pin's circular shearing edge is shifted in executing its shear stroke, the moving circular shearing edge of the blow pin and the stationary misaligned half-circle shearing edges carried by the mold members are mutually damaging. In like sense, the sealing half-circle rims fixedly carried by the mold members in conventional apparatus when misaligned may be damaged by and may cause damage to the sealing ring of the blow pin as the mold members are being driven closed.

FIGS. 5 and 6 illustrate misalignment of the mold members and the corrective motion of the shear steels to bring the shear half-circles into the desired full-circle relationship.

In FIG. 5, as in FIG. 6, mold members 10 and 10a and their mounting bases 14 and 14a are misaligned to the extent Δ along a line L perpendicular to the axis of the blow pin and perpendicular to the direction of movement of the mold members in opening and closing.

In FIG. 5, the shear steels 18 and 18a are shown centered in the oversize spaces that contain them in their mounting bases 14, 14a. As the mold members move toward each other, half-circle sealing rims 28 embrace the sealing ring 22 of the blow pin. What may be called the lower "arm" 18c of shearing steel 18 is cammed downward by sealing ring 22, shifting shear steel 18 downward in the drawing. The hole in shear steel 18 for screw 23 is oversize in relation to the screw (FIG. 4) to accommodate such shift of the shear steel. A thinned amount of plastic is interposed between sealing ring 22 and each sealing edge 28, but the end result is that each sealing half-circle 28 is centered opposite to the sealing ring 22 of the blow pin. The same action occurs with respect to the other sealing half-circle 18a; its "arm" 18c' is pressed by sealing ring 22 so as to shift shear steel 18a upward in FIG. 5, ultimately to be centered opposite to sealing rim 22 as shown in FIG. 6.

The fact that each shearing edge 30 is fixed to the corresponding sealing half-circle rim 28 and is slidable parallel to line L signifies that both the half-circle sealing rims and the half-circle shearing edges will ultimately form shearing and sealing circles, and that those circles will be centered on the blow pin's axis. The composite shearing edge 30 of the two shear steels will form a circle consistently aligned with the shearing edge of ring 24 of the blow pin, thus avoiding mutual damage when the blow pin performs its shearing stroke.

There is a limit in practice to the kind of performance outlined above. If there were an excessively large amount of looseness in the guides that align the mold members as they close, sharp corners of the half-circle sealing rims might puncture the parison in a manner that would allow escape of air during the container-forming burst of air that expands the parison. However, the described performance is attainable despite a substantial amount of wear and resulting looseness of the mold members' guides.

When the mold members are forcibly closed, with the pre-loading described in connection with the toggle-linkage mechanism, coacting slide surfaces 19, 21 are capable of exerting great force in holding the mold members closed, and in driving the sealing steels against rim 22. Precision in aligning the half-circle shear edges 30 as a circle may depend on developing an enormous amount of force closing the half-circle sealing rims 28 against sealing rim 22. Some of the material of the parison may be squeezed away. Some remaining material of the parison nevertheless remains and complements the sealing half-rims 28 and the sealing ring 22 in forming a seal.

Despite misalignment of the mold members (within a limited range), the centers of the two semicircular shearing edges 30 are brought into alignment with each other to form a circular shearing edge, and into alignment with the shearing edge of the blow pin. Ideally, the radius of each half-circle sealing rim 28 is made equal to or only slightly larger than the radius of the blow pin's sealing ring 22. Accordingly, when the sealing rims 28 of the shear steels 18, 18a are forced into metal-to-metal contact with the sealing ring 22 of the blow pin, the shearing edges 30 form a circular shearing edge which is coaxial with the circular shearing edge of the blow pin (the upper edge of ring 24). Some small amount of the material of the parison may remain in the interface between half-circle sealing rims 28 and the sealing ring 22 of the blow pin, perfecting the seal. Later, when the burst of air enters the parison within the mold cavity, the seal prevents the high pressure air from entering (and inflating) that portion of the parison which is above the sealing ring.

As already noted, it may be considered desirable to modify the above-described sealing rims into discrete elements, for separately performing the two functions of sealing rims 28, 28a. The modified shear steel 18' (FIGS. 7 and 8) includes a locating element 36 and a sealing rim 38. The radius of locating rim 36 optimally equals the radius of sealing ring 22 of the blow pin. Locating element 36 of each shear steel makes metal-to-metal contact with sealing ring 22 of the blow pin when the mold is closed. The radius of the sealing rim 38 is a bit larger than that of the locating element 36 to allow the customary space for the material of the parison to form a seal around the sealing ring 22 when the locating element 36 is pressed against the sealing rim 22. Locating element 36 is semi-circular for simplifying manufacture of the shear steel, but locating element 36 can be made in a variety of shapes for coaction with ring 22 for adjusting the shear steel.

Shearing edge 30' is spaced from but fixed coaxially in relation to the combined rims 36, 38. A pair of shear steels 18' is used with the blow pin 12 shown in FIG. 2 and described above; the pair of shear steels 18' replace shear steels 18, 18a in the two-part mounting base 14, 14a and, except as noted above, the two shear steels 18', 18' have the same relationships to the mounting base and to the blow pin as described above for shear steels 18, 18a.

A further modification of the shear steel and mounting base assemblies of FIGS. 2–7 is shown in FIGS. 9 and 10. Reference numerals in the "100" series are used to designate elements in FIGS. 9 and 10 for elements that are the same as those in FIGS. 2–7, and except as indicated below, the description of the elements in FIGS. 2–7 and of their operation applies to corresponding elements of the "100" series.

In FIGS. 9 and 10, two screws 123 (rather than one) are used for holding each shear steel 118, 118a captive in its mounting base 114, 114a, for more securely retaining the shear steels in place, while accommodating sliding motion of the shear steels (vertically in the drawings) toward the upper or lower limits 116 of the space in each mounting base that receives a respective shear steel.

Two screws 34 extend in threaded bores in each of the mounting bases. Each mounting base has a pair of screws that are spaced apart substantially. They have flat inner ends, bearing against a guide surface 119 of the respective shear steel. The flat ends of the screws of each pair of screws constitute slide guiding means that cooperates with the slide guiding surface 119 of a respective one of the shear steels 118, 118a. Surfaces 121 are not used as guide surfaces.

Screws 34 are adjusted before the mounting bases are secured to the mold members. Screws 34 are adjusted so that the diametrically opposite extremities of the sealing rims and of the shearing edges of the pair of shear steels are in abutment with one another when their mounting bases are in abutment. In that condition, the pair of semicircular sealing rims form a circle whose diameter develops the intended cooperation with the sealing portion of the blow pin. Correspondingly, the pair of shearing edges forms a circle whose diameter develops the intended cooperation with the shearing portion of the blow pin.

In operation, when the mold members are being driven toward each other, adjustment of shear steels 118, 118a occurs in the manner illustrated by FIGS. 5 and 6 for alignment in the direction perpendicular to the closing stroke of the molds and perpendicular to the axis of the blow pin. The pair of semicircular sealing rims 128 and the pair of semicircular shearing edges 130 become full circles, cooperating properly with the blow pin. The advance adjustment of screws 34 establishes the diameters of those full circles in the direction d, i.e., along the line of the closing stroke of the molds.

Screws 34 are of a self-locking type; they should be chosen to maintain their initial adjustment through large numbers of blow molding cycles. If the screw adjustment should shift, or if wear should develop in the course of many blow-molding cycles, the desired precise relationships of the sealing rims and the shearing edges can be reestablished by again adjusting screws 34.

The pairs of screws shown and described constitute a simple, economical and relatively inexpensive form of adjustment; yet other forms of adjustment may be substituted.

The invention is represented by the illustrative embodiment described above and shown in the drawings, and by the described modifications, but it is apparent that other modifications may be made by those skilled in the art. Consequently, the invention should be construed broadly in accordance with its true spirit and scope.

I claim:

1. A pair of shear steels for use in blow-molding apparatus, said blow molding apparatus including a blow pin operable along an axis and bearing a shearing ring providing a circular shearing edge whose center is on said axis, and said apparatus having a pair of mold members adapted to close against each other with said blow pin disposed between them and to carry said shear steels into cooperation with said blow pin, said pair of shear steels including (a) respective semicircular shearing edges which constitute a full-circle shearing edge when the shear steels are disposed opposite to each other so that the centers of their semicircular shearing edges are disposed on a common axis, said shear steels having (b) respective sealing rims adapted to cooperate with the blow pin for forming a seal in the neck of a container being blow-molded, and each of said shear steels having (c) locating means cooperable with said blow pin when carried against the blow pin by said mold members for shifting each shear steel so as to align said common axis of each shear steel with the axis of the blow pin's circular shearing edge.

2. A pair of shear steels as in claim 1, wherein said sealing rims constitute said locating means.

3. A pair of shear steels as in claim 1, wherein said sealing rims and said locating means are separate, discrete elements.

4. A pair of shear steels as in claim 1, having guiding means cooperable with respective ones of said mold members for constraining each shear steel to move along a path parallel to a line between the extremities of its semicircular shearing edge.

5. A pair of Shear steels as in claim 1, in combination with respective mounting bases adapted to be secured to said mold members, respectively, each of said shear steels and each of said mounting bases having cooperating guiding means for guiding movement of the shear steels relative to their mounting bases along paths parallel to lines between the extremities of said semicircular shearing edges, respectively.

6. A pair of shear steels as in claim 5, wherein said sealing rims constitute said locating means.

7. Apparatus for blow molding a container having a neck, said apparatus having a blow pin operable along an axis and having a sealing ring and a shearing ring in axial alignment, and a pair of mold members movable toward and away from each other to close and open the mold, said mold members carrying respective devices cooperable with the blow pin for acting on a parison extending along and around the blow pin to form a seal surrounding the blow pin and for providing a full-circle shearing edge cooperable with the shearing ring of the blow pin to shear the parison when the blow pin is operated axially, the improvement wherein each of said devices includes a shear steel having a semicircular shearing edge and a semicircular sealing rim which are unified with each other and which have a common axis, and each said shear steel-having locating means cooperable with the blow pin for shifting the shear steel as may be necessary for aligning each said common axis with the axis of the blow pin, each shear steel being mounted on its respective mold member for sliding motion along a slide path perpendicular to the direction of movement of the mold members in opening and closing and perpendicular to the axis of the blow pin.

8. Apparatus for blow molding a container as in claim 7 wherein said semicircular sealing edge of each shear steel acts as said locating means.

9. Apparatus as in claim 7, wherein each shear steel includes discrete locating means separate from said sealing rim.

10. Apparatus for blow molding containers as in claim 7, wherein each of said devices carried by a respective one of said mold members includes a mounting base fixed to its mold member, each mounting base having a rectangular cavity for a shear steel, each shear steel having a first side at which said semicircular sealing rim and said semicircular shearing edge form recesses and having a second side opposite to said first side, said second side of each shear steel and one side of said rectangular cavity constituting cooperating guide surfaces for determining said slide path, and said shear steel being shorter than the rectangular cavity for accommodating a range of sliding motion of the shear steel in said cavity.

11. Apparatus for blow molding a container as in claim 7 which includes means for operating the mold members into pre-loaded cooperation with each other and for thereby driving the locating means of each shear steel into firm shear-steel adjusting cooperation with the blow pin.

12. The combination of shearing steels and mounting bases as in claim 5, wherein said guiding means includes means for adjusting said cooperating guiding means in the direction of the closing and opening motion of the mold members.

13. Blow-molding apparatus as in claim 7, wherein each of said shear steels has guide means cooperating with companion guide means of said mold members, respectively, for establishing said slide path, further including means for adjusting the guide means of each shear steel relative to its cooperating companion guide means in the direction of the closing and opening motion of the mold members.

* * * * *